United States Patent
Matsuo et al.

(10) Patent No.: US 9,936,490 B2
(45) Date of Patent: Apr. 3, 2018

(54) WIRELESS COMMUNICATION SYSTEM, LOW TRANSMISSION POWER CELL BASE STATION, MACROCELL BASE STATION, WIRELESS TERMINAL, AND LOAD DISTRIBUTION METHOD

(75) Inventors: Hidenori Matsuo, Kanagawa (JP); Takahisa Aoyama, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 401 days.

(21) Appl. No.: 13/816,825

(22) PCT Filed: Aug. 10, 2011

(86) PCT No.: PCT/JP2011/004531
§ 371 (c)(1),
(2), (4) Date: Feb. 13, 2013

(87) PCT Pub. No.: WO2012/029237
PCT Pub. Date: Mar. 8, 2012

(65) Prior Publication Data
US 2013/0136029 A1 May 30, 2013

(30) Foreign Application Priority Data
Sep. 3, 2010 (JP) ................. 2010-197829

(51) Int. Cl.
*H04W 72/04* (2009.01)
*H04W 24/10* (2009.01)
*H04W 84/04* (2009.01)

(52) U.S. Cl.
CPC ......... *H04W 72/042* (2013.01); *H04W 24/10* (2013.01); *H04W 72/0426* (2013.01); *H04W 84/045* (2013.01)

(58) Field of Classification Search
CPC ............... H04W 72/04; H04W 72/042; H04W 72/0426; H04W 72/0413; H04W 72/08;
(Continued)

(56) References Cited

U.S. PATENT DOCUMENTS

2010/0069063 A1* 3/2010 Osterling .............. H04W 36/20
455/434
2010/0278133 A1* 11/2010 Tidestav ............... H04L 1/0026
370/329

(Continued)

FOREIGN PATENT DOCUMENTS

WO    WO 2010068012 A2 *  6/2010  .......... H04W 72/082

OTHER PUBLICATIONS

ATT&T, CMCC, CATR, CHTTL, Deutsche Telekom AG, Ericsson, ST-Ericsson, ETRI, HTC, KDDI, Kyocera, MediaTek, Nokia, Nokia-Siemens Neworks, NTT DOCOMO, Orange, Pantech, picoChip, Qualcomm Inc, Samsung, Telecom Italia, Texas Instructments, Telefonica, Verizon Wireless, Way Forward on eICIC for non-CA based HetNets, TSG-RAN WG1 Meeting #62 R1-105082, Aug. 23, 2010.

(Continued)

*Primary Examiner* — Andrew Chriss
*Assistant Examiner* — Rasha Fayed
(74) *Attorney, Agent, or Firm* — Pearne & Gordon LLP

(57) ABSTRACT

A macrocell base station controls to reduce interference between cells by a downlink signal of the macrocell base station with specific timing, the interference which a downlink signal of a low transmission power cell suffers for a wireless terminal. A low transmission power cell base station decides measurement timing with which the wireless terminal measures reception quality of the low transmission power cell based on information about the specific timing, and sends a setting message including a parameter according (Continued)

to the measurement timing to the wireless terminal. The wireless terminal measures reception quality with the measurement timing indicated by the parameter, and when the wireless terminal satisfies a condition for executing an event based on the measured result, the wireless terminal sends a reception quality measurement message including information indicating that the measurement is made with the measurement timing to the low transmission power cell base station.

8 Claims, 17 Drawing Sheets

(58) Field of Classification Search
CPC ... H04W 24/10; H04W 84/045; H04W 28/02; H04W 48/20; H04W 4/00; H04W 36/04; H04W 36/0083; H04W 52/02; H04W 52/00; H04W 52/52; H04W 52/06; H04W 52/40; H04W 52/12; H04W 52/10; H04W 52/08; H04W 52/0245
USPC ....... 370/252, 332, 328, 331, 335, 333, 334, 370/338; 455/436, 444, 437, 443, 522, 455/425, 70, 69, 418, 442, 439, 67.13, 455/434, 63.1, 438
See application file for complete search history.

(56) References Cited

U.S. PATENT DOCUMENTS

| | | | | |
|---|---|---|---|---|
| 2010/0303013 | A1* | 12/2010 | Khandekar | H04W 99/00 370/328 |
| 2011/0039577 | A1* | 2/2011 | Stern-Berkowitz | G01S 5/0205 455/456.1 |
| 2011/0217985 | A1* | 9/2011 | Gorokhov | H04W 24/10 455/452.2 |
| 2011/0223923 | A1* | 9/2011 | Cho | H04W 72/082 455/448 |
| 2011/0249643 | A1* | 10/2011 | Barbieri | H04L 1/0026 370/329 |
| 2011/0312358 | A1* | 12/2011 | Barbieri | H04W 24/10 455/507 |
| 2011/0319025 | A1* | 12/2011 | Siomina | H04B 7/024 455/63.1 |
| 2012/0046063 | A1* | 2/2012 | Chande | H04W 52/143 455/522 |
| 2013/0045770 | A1* | 2/2013 | Aschan | H04W 52/0216 455/522 |
| 2013/0136027 | A1* | 5/2013 | Matsuo | H04W 24/10 370/252 |

OTHER PUBLICATIONS

Ericsson, ST-Ericsson, Considerations on non-CA based heterogeneous deployments, 3GPP TSG-RAN WG1 #61 R1-102618, May 10, 2010.
Huawei, HiSilicon, The possible restrictions on the configuration of almost blank subframes in Macro-Pico deployments, 3GPP TSG RAN WG1 meeting #62bis RI-105150, Oct. 11, 2010
Huawei, HiSilicon, Way forward on backhaul•based eICIC, TSG-RAN WG1 Meeting #62bis R1-105726, Oct. 11, 2010.
ZTE, Discussion on measurement restriction of eICIC, 3GPP TSG-RAN WG2 meeting #72 R2-106332, Nov. 15, 2010.
R1-010701, "Importance of Serving Cell Selection in Heterogeneous Networks", Qualcomm Incorporated, 3GPP TSG RAN WG1 #59 Contribution, Jan. 2010.
R1-102307, "Interference Coordination for Non-CA-based Heterogeneous Networks", NTT DOCOMO, 3GPP TSG RAN WG1 #60bis Contribution, Apr. 2010.
International Search Report for Application No. PCT/JP2011/004531 dated Nov. 22, 2011.

* cited by examiner

WIRELESS COMMUNICATION SYSTEM, LOW TRANSMISSION POWER CELL BASE STATION, MACROCELL BASE STATION, WIRELESS TERMINAL, AND LOAD DISTRIBUTION METHOD

TECHNICAL FIELD

The present invention relates to a wireless communication system, a low transmission power cell base station, a macrocell base station, a wireless terminal, and a load distribution method for distributing a load of the macrocell base station.

BACKGROUND ART

The standards development organization 3GPP (The 3rd Generation Partnership Project) has promoted standardization of LTE-Advanced (Long Term Evolution Advanced: LTE-A) as next-generation wireless communication standards compatible with LTE (Long Term Evolution). The LTE-A has examined a wireless IF (Interface) for efficiently covering a local area of indoor facilities etc. in which a high volume of traffic is intensively generated in addition to cell arrangement centered on a conventional macrocell. With this, a heterogeneous network (HetNet) in which a low transmission power cell (also called an "LPN (Low Power Node)") such as a pica-cell or a femto-cell is arranged inside a macrocell has been examined. A HetNet environment will hereinafter be described using the pica-cell as the low transmission power cell.

The HetNet environment is provided with a macrocell base station for building a macrocell, and a pico-cell base station for building a pico-cell inside the macrocell. In addition, frequencies respectively used by the macrocell base station and the pico-cell base station are desirably the same in view of efficient use of the frequency in the HetNet environment. Since the macrocell base station covers a range wider than the pico-cell base station, its load is relatively high. Consequently, a load of the macrocell base station is desirably distributed to the pico-cell base station in order to reduce the load of the macrocell base station in the HetNet environment.

One art for implementing load distribution of the macrocell base station includes "Range Expansion" (see Non-patent Reference 1). FIG. 16 is a diagram conceptually showing the technical contents of "Range Expansion". According to this art, a wireless terminal (UE: User Equipment) connected to a pico-cell located in the pico-cell edge periphery maintains connection to the pico-cell, or UE connected to a macrocell is actively connected to a pico-cell. That is, in order to give priority to connection between the UE and the pico-cell, an area in which the UE is connected to the pico-cell is expanded by applying an offset to downlink reception quality of the pico-cell. However, the UE connected to the pico-cell or the UE in which connection to the pico-cell is maintained by the art greatly suffers interference between cells from the macrocell in the environment in which each of the macrocell and the pico-cell uses the same frequency.

CITATION LIST

Patent Literature

Non-patent Document 1: R1-100701, "Importance of Serving Cell Selection in Heterogeneous Networks", Qualcomm Incorporated, 3GPP TSG RAN WG1 #59 Contribution, January 2010

Non-patent Document 2: R1-102307, "Interference Coordination for Non-CA-based Heterogeneous Networks", NTT DOCOMO, 3GPP TSG RAN WG1 #60bis Contribution, April 2010

SUMMARY OF INVENTION

Technical Problem

As described above, when the art called "Range Expansion" is used in order to reduce the load of the macrocell base station in the HetNet environment, the UE connected to the pico-cell greatly suffers interference between cells from the macrocell. The interference between cells is undesirable since the interference causes a decrease in throughput. Consequently, for example, it is necessary to perform interference control called "Almost Blank Subframe" (see Non-patent Reference 2).

FIG. 17 is a diagram conceptually showing the technical contents of "Almost Blank Subframe". As shown in FIG. 17, in the interference control, that is, "Almost Blank Subframe", in a state in which the macrocell base station is synchronized with the pico-cell base station, a specific subframe of a downlink signal of the macrocell does not send a signal other than a control signal (for example, a Common Reference Signal (CRS)) or sends a signal with transmission power reduced. As a result, in this specific subframe, interference between cells from the macrocell can be reduced. However, this effect is not obtained in subframes other than the specific subframe.

When "Range Expansion" is implemented in order to distribute the load of the macrocell base station in the HetNet environment thus, the interference between the macrocell and the pico-cell increases, so that it is necessary to perform interference control by "Almost Blank Subframe" etc. However, as described above, the effect of reducing the interference between cells from the macrocell by the interference control is limited. Because of this, a method for distributing the load without increasing the interference between the macrocell and the pica-cell is expected.

An object of the invention is to provide a wireless communication system, a low transmission power cell base station, a macrocell base station, a wireless terminal and a load distribution method capable of distributing a load of the macrocell base station without increasing interference between a macrocell and a low transmission power cell.

Advantageous Effects of Invention

According to the wireless communication system, the low transmission power cell base station, the macrocell base station, the wireless terminal and the load distribution method according to the invention, the load of the macrocell base station can be distributed without increasing interference between the macrocell and the low transmission power cell.

DESCRIPTION OF EMBODIMENTS

Embodiments of the invention will hereinafter be described with reference to the drawings.

Figure 1:
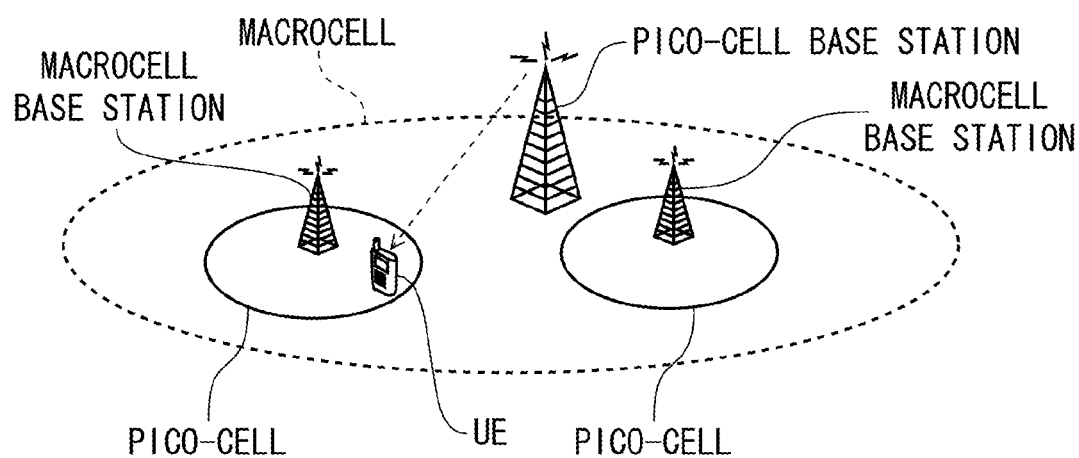
FIG. 1 is a diagram showing one example of a wireless communication system of a HetNet environment.
Figure 2:
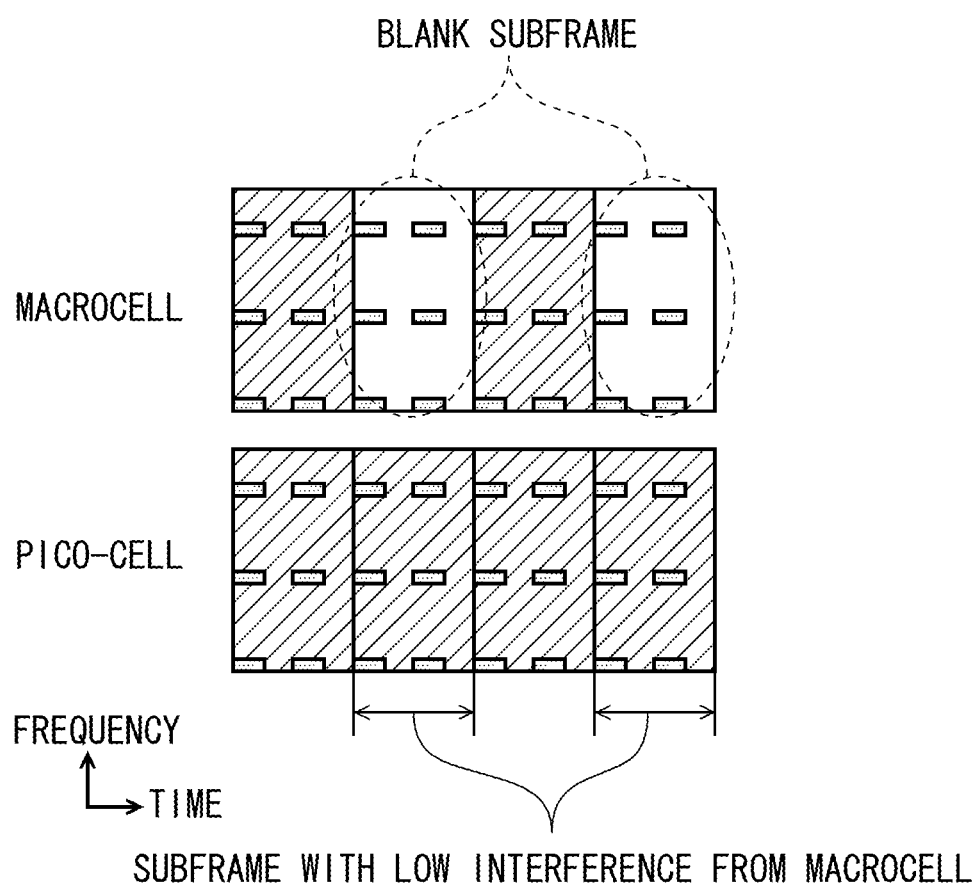
FIG. 2 is a diagram showing a subframe of a pico-cell and a subframe of a macrocell in which "Almost Blank Subframe" is performed.

In first, second, fourth and fifth embodiments described hereinafter, in a wireless communication system of a HetNet (Heterogeneous Network) environment shown in FIG. 1, a macrocell base station performs interference control called "Almost Blank Subframe" described above. That is, the macrocell base station does not send a signal other than a control signal (for example, a Common Reference Signal (CRS)) or sends a signal with transmission power reduced in a specific subframe of a downlink signal of a macrocell as shown in FIG. 2. Hereinafter, the specific subframe is called a "blank subframe". Information about timing of the blank subframe is shared between the macrocell base station and a pico-cell base station formed inside the macrocell by the macrocell base station.

First Embodiment

In a first embodiment, with respect to a wireless terminal (UE: User Equipment) which is connected to a pico-cell which is a low transmission power cell but is likely to hand over to a macrocell since reception quality of the pico-cell is bad, the UE measures the reception quality with timing of good reception quality of the pico-cell. In addition, the timing of good reception quality of the pico-cell for the wireless terminal (hereinafter called "pico-UE") which is connected to the pico-cell refers to timing of a blank subframe of the macrocell.

Figure 3:
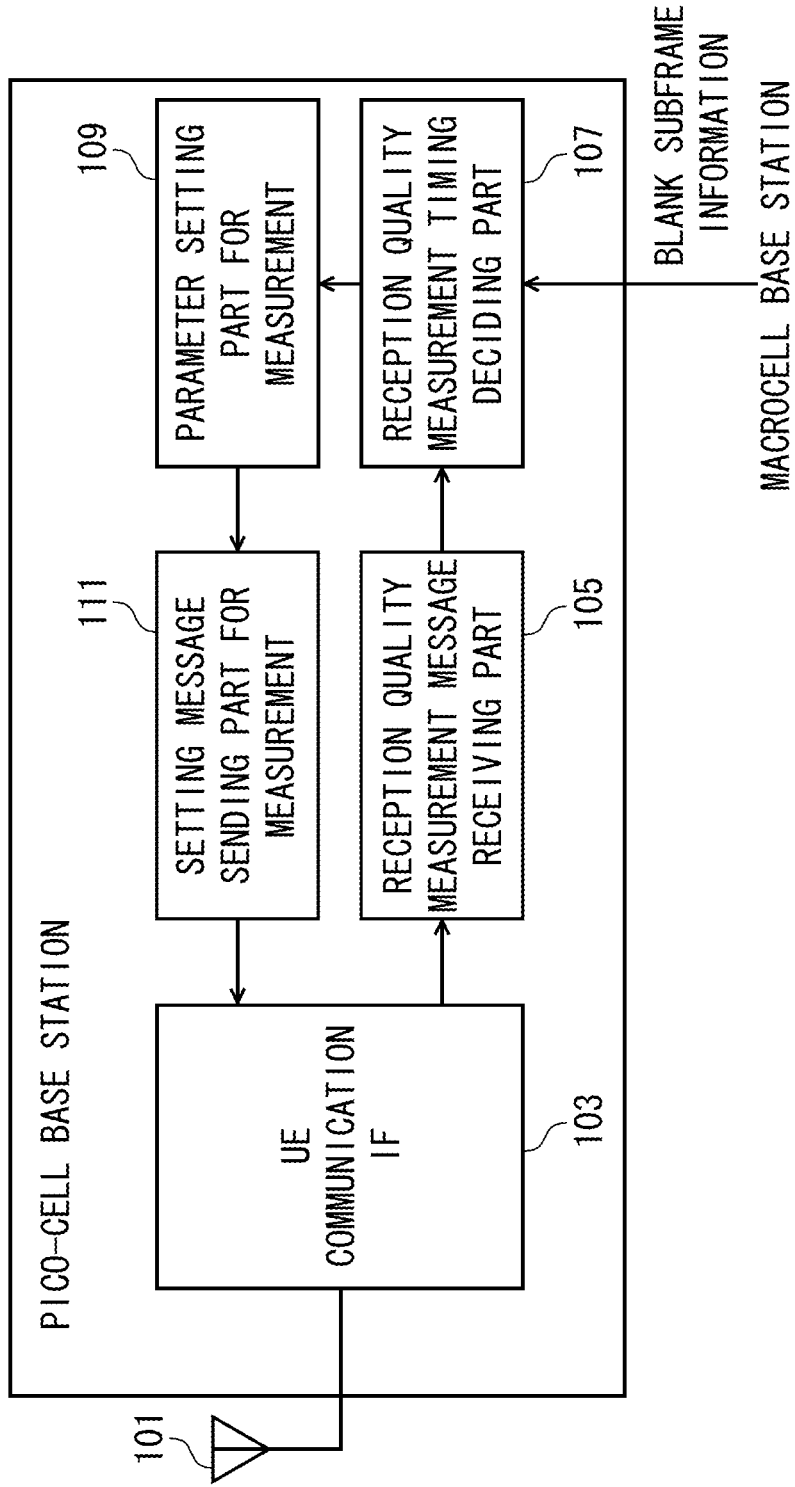
FIG. 3 is a block diagram showing a configuration of a pico-cell base station of a first embodiment.

FIG. 3 is a block diagram showing a configuration of a pica-cell base station of the first embodiment. As shown in FIG. 3, the pico-cell base station of the first embodiment includes an antenna 101, a UE communication interface part (UE communication IF) 103, a reception quality measurement message receiving part 105, a reception quality measurement timing deciding part 107, a parameter setting part 109 for measurement, and a setting message sending part 111 for measurement.

The UE communication IF 103 is an interface for communicating with the pico-UE. The reception quality measurement message receiving part 105 receives a reception quality measurement message (Measurement Report) sent from the pico-UE. The reception quality measurement timing deciding part 107 decides timing with which the pico-UE measures reception quality of the pico-cell based on information (blank subframe information) about timing of a blank subframe sent from a macrocell base station. In addition, the reception quality measurement timing deciding part 107 decides timing of the blank subframe indicated by the blank subframe information as reception quality measurement timing.

The parameter setting part 109 for measurement sets a parameter for measurement according to the reception quality measurement timing decided by the reception quality measurement timing deciding part 107 in a setting message for measurement described below. In addition, the parameter setting part 109 for measurement may set identification information in the parameter for measurement. The setting message sending part 111 for measurement sends a setting message for measurement (Measurement Configuration) including the parameter for measurement of reception quality to the pico-UE.

Figure 4:
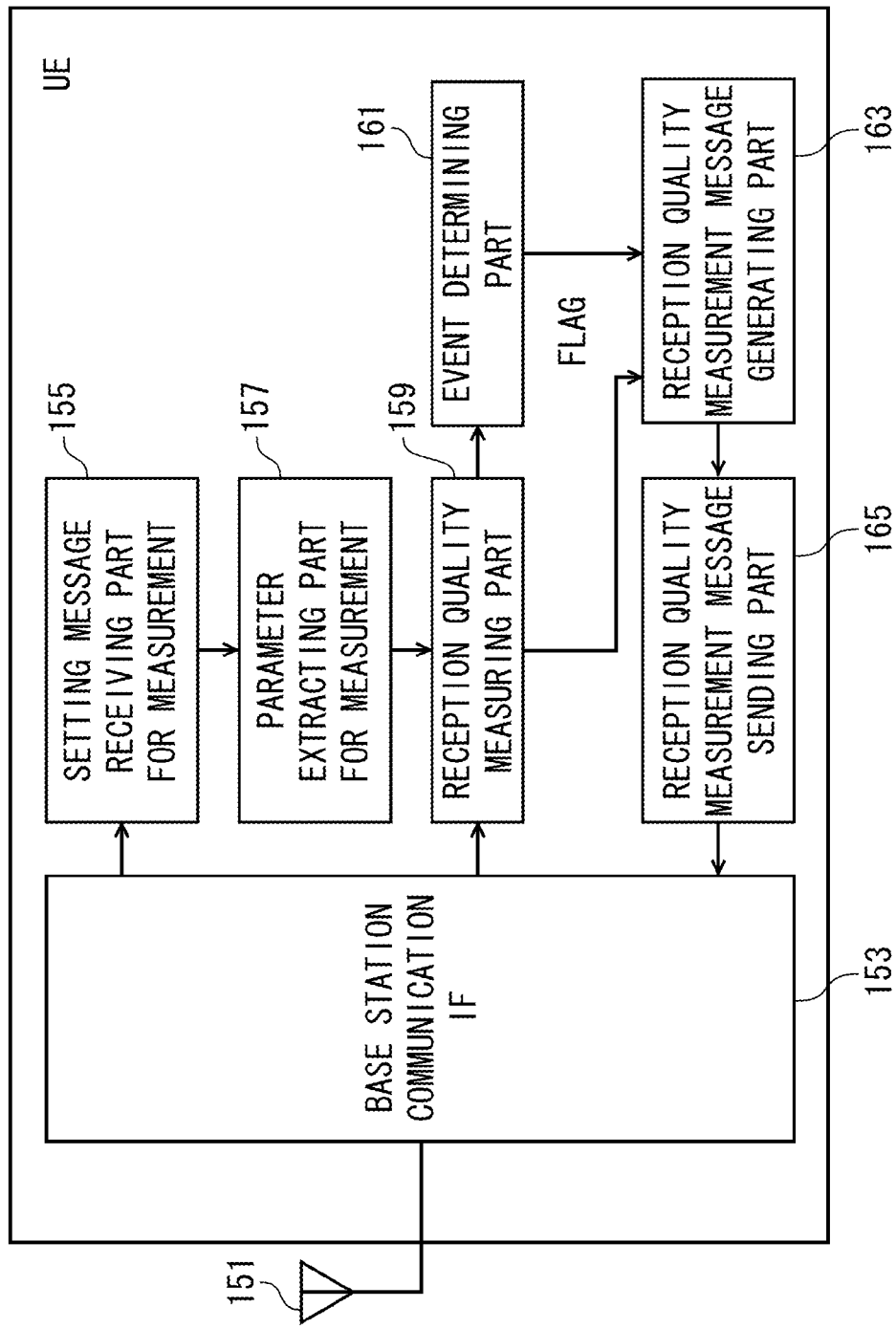
FIG. 4 is a block diagram showing a configuration of UE of the first embodiment.

FIG. 4 is a block diagram showing a configuration of the UE of the first embodiment. As shown in FIG. 4, the UE of the first embodiment includes an antenna 151, a base station communication interface part (base station communication IF) 153, a setting message receiving part 155 for measurement, a parameter extracting part 157 for measurement, a reception quality measuring part 159, an event determining part 161, a reception quality measurement message generating part 163, and a reception quality measurement message sending part 165.

The base station communication IF 153 is an interface for communicating with the pica-cell base station. The setting message receiving part 155 for measurement receives a setting message for measurement sent from the pica-cell base station. The parameter extracting part 157 for measurement extracts a parameter for measurement from the setting message for measurement received by the setting message receiving part 155 for measurement.

The reception quality measuring part 159 measures reception quality of a downlink signal from the pico-cell base station or the macrocell base station. Also, when the parameter extracting part 157 for measurement extracts the parameter for measurement, the reception quality measuring part 159 measures the reception quality of the downlink signal from the pico-cell base station with timing indicated by the parameter for measurement. In the case of measuring the reception quality of the downlink signal from the connected pico-cell base station with timing (timing of a blank subframe) indicated by the parameter for measurement, the reception quality measuring part 159 sends a flag indicating that the reception quality is measured with the timing to the reception quality measurement message generating part 163.

The event determining part 161 determines whether or not the UE satisfies a condition (event condition) for executing an event such as handover based on a measured result of the reception quality measuring part 159. In addition, the determination is an absolute value determination by comparison between a threshold value and a measured value of reception quality, or a determination of a relative value to reception quality of a peripheral cell. For the absolute value determination, the event determining part 161 determines that the event condition is satisfied when reception quality of the pico-cell decreases and the measured value of reception quality falls below the threshold value.

The reception quality measurement message generating part 163 generates a reception quality measurement message including a determined result of the event determining part 161. In addition, when the flag indicating that the reception quality is measured with the timing of the blank subframe is sent from the reception quality measuring part 159, the reception quality measurement message generating part 163 includes the flag in the reception quality measurement message. Also, when identification information about the parameter for measurement is included in the setting message for measurement, the reception quality measurement message generating part 163 includes the identification information about the parameter for measurement in the reception quality measurement message in order to indicate that reception quality is measured with timing indicated by the parameter for measurement.

The reception quality measurement message sending part 165 sends the reception quality measurement message generated by the reception quality measurement message generating part 163 to the pico-cell base station or the macrocell base station.

Figure 5:
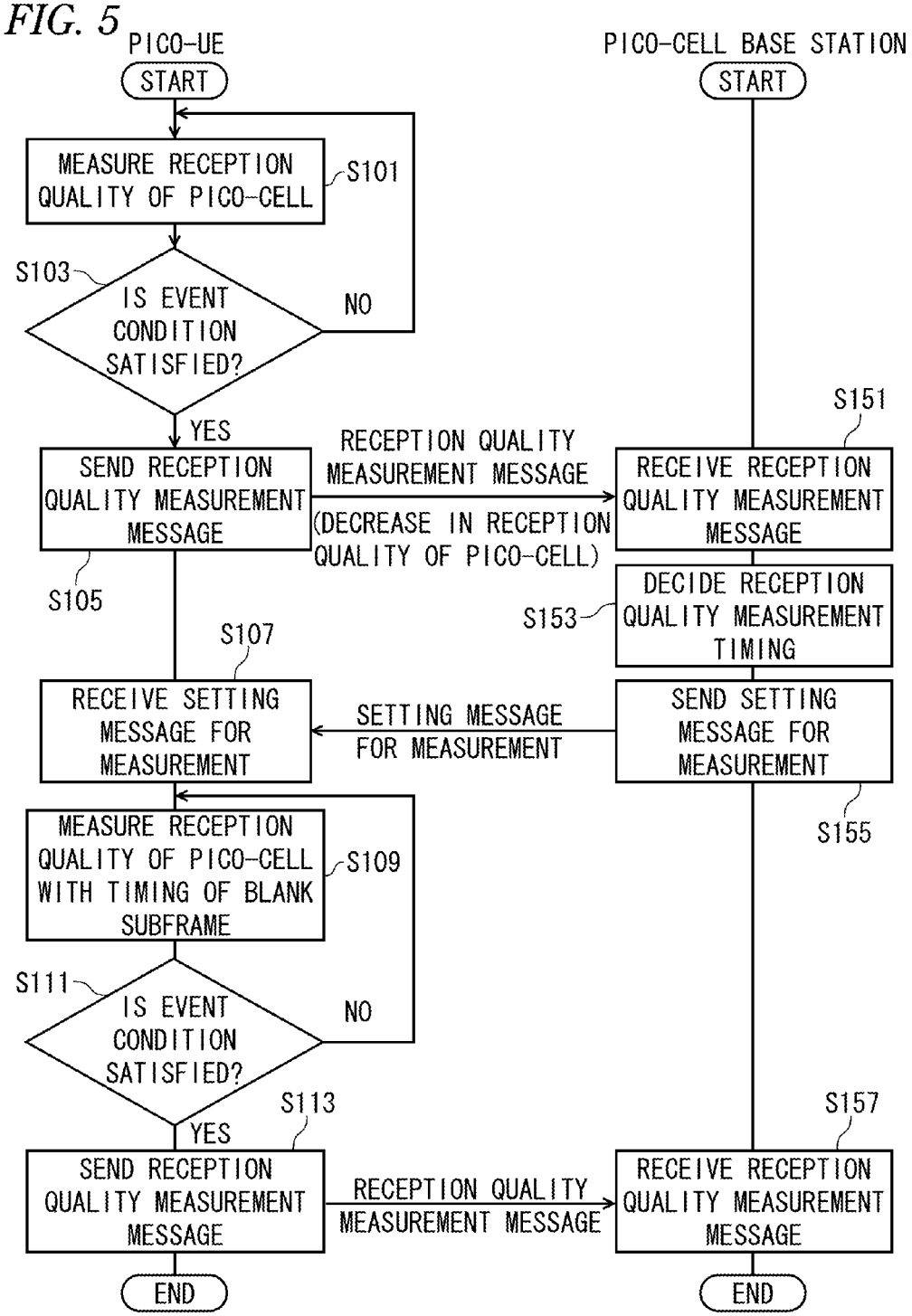
FIG. 5 is a flowchart showing each operation of a pica-UE and the pica-cell base station in a state in which the UE of the first embodiment is connected to the pico-cell base station, and is signaling between the pico-UE and the pico-cell base station.

FIG. 5 is a flowchart showing each operation of the pico-UE and the pica-cell base station in a state in which the UE of the first embodiment is connected to the pico-cell base station, and is signaling between the pico-UE and the pico-cell base station. As shown in FIG. 5, the pico-UE measures reception quality of a pico-cell (step S101). Next, the pico-UE determines whether or not an event condition is satisfied (step S103). In the case of determining that the reception quality of the pico-cell decreases and the event condition is satisfied in step S103, the flowchart proceeds to step S105, and in the case of determining that the event condition is not satisfied, the flowchart returns to step S101. In step S105, the pico-UE sends a reception quality measurement message to the pico-cell base station.

The pico-cell base station receives the reception quality measurement message sent from the pico-UE in step S105 (step S151). Next, the pico-cell base station decides reception quality measurement timing of the pico-UE based on timing of a blank subframe indicated by blank subframe information obtained from the macrocell base station (step S153). Then, the pico-cell base station sends a setting message for measurement including a parameter for measurement according to the reception quality measurement timing decided in step S153 to the pico-UE (step S155).

The pico-UE receives the setting message for measurement sent from the pico-cell base station in step S155 (step S107). Then, the pico-UE measures reception quality of the pico-cell with timing indicated by the parameter for measurement included in the setting message for measurement, that is, timing of the blank subframe (step S109). Then, the pico-UE determines whether or not an event condition similar to that of step S103 is satisfied (step S111). In the case of determining that the event condition is satisfied in step S111, the flowchart proceeds to step S113, and in the case of determining that the event condition is not satisfied, the flowchart returns to step S109. In step S113, the pico-UE sends a reception quality measurement message including identification information about the parameter for measurement or a flag indicating that the reception quality is measured with the timing of the blank subframe to the pico-cell base station.

The pico-cell base station receives the reception quality measurement message sent from the pico-UE in step S113 (step S157). After step S157, the pica-cell base station and the pico-UE execute an event such as handover to the macrocell.

According to the first embodiment as described above, even when reception quality of the pico-cell measured by the pico-UE decreases and the event condition is satisfied once, the event is not executed immediately, and reception quality of the pico-cell is again measured with timing specified by the pico-cell base station. This timing with which the reception quality of the pico-cell is again measured is timing of sending a blank subframe in which the macrocell base station does not send a signal other than a control signal or sends a signal with transmission power reduced. As compared with timing of other subframe, interference (interference between cells) which the pico-UE suffers from the macrocell base station with timing of the blank subframe is small. Because of this, reception quality again measured by the pico-UE with timing of the blank subframe is better than reception quality in the case of being measured with other timing. As a result, connection between the pico-cell and the pico-UE which is likely to hand over to the macrocell is maintained. Thus, a state in which a load of the macrocell base station is distributed can be continued without using the art called "Range Expansion" described in the background art.

In addition, in the present embodiment, the reception quality measurement timing deciding part 107 of the pico-cell base station decides timing with which the pico-UE measures reception quality based on blank subframe information, but may decide timing with which the pico-UE does not measure reception quality.

Second Embodiment

In the first embodiment, the pico-cell base station instructs the pico-UE in which the event condition is satisfied to again measure reception quality with timing of a blank subframe. In a second embodiment, a pico-UE itself decides whether or not to again measure reception quality with timing of a blank subframe. As a result, a pico-cell base station of the second embodiment previously notifies the pico-UE of information about timing (timing of the blank subframe) in the case of again measuring reception quality by notification information or a setting message for measurement.

Figure 6:
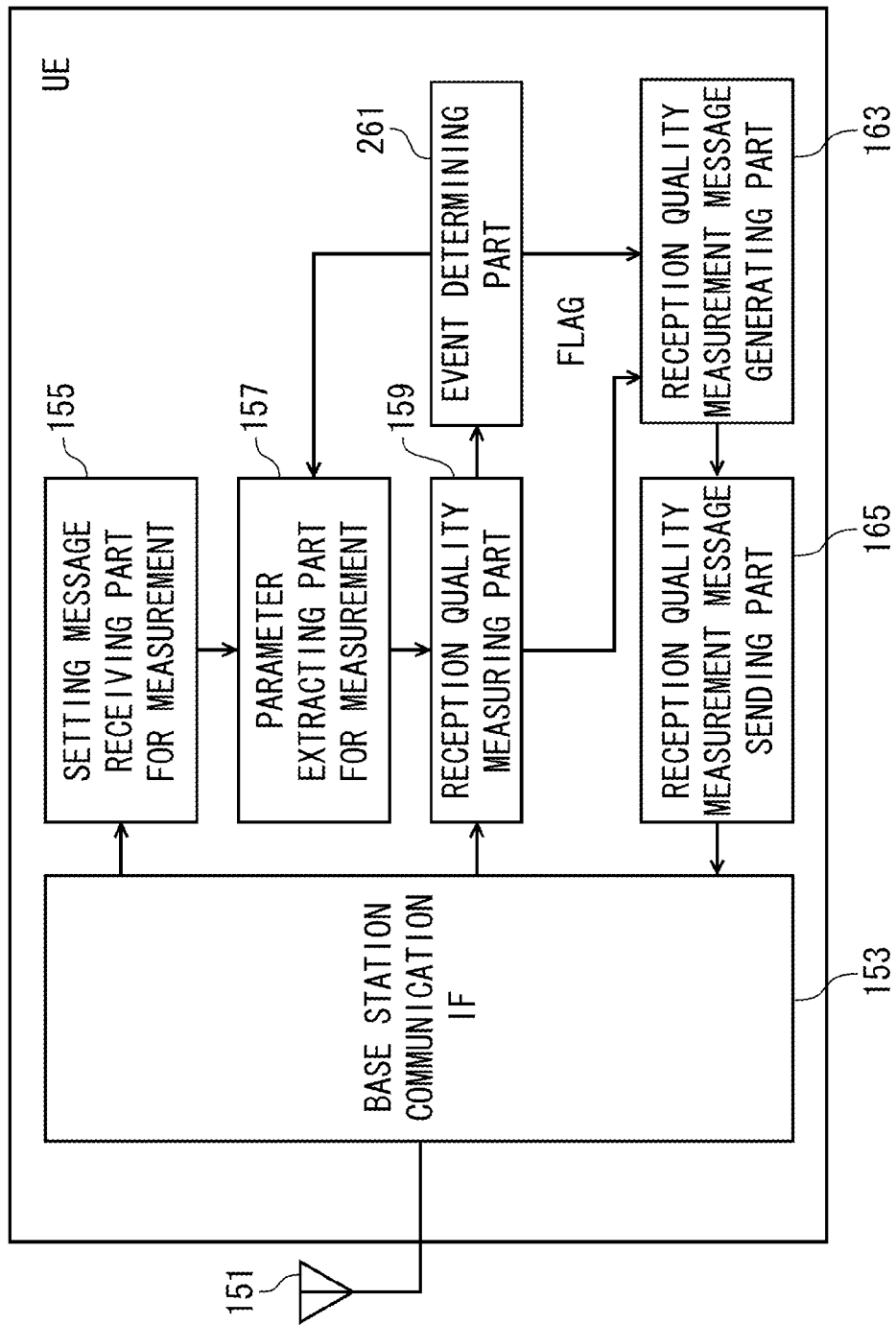
FIG. 6 is a block diagram showing a configuration of UE of a second embodiment.

A configuration of the pico-cell base station of the second embodiment is similar to the configuration of the pico-cell base station of the first embodiment shown in FIG. 3. FIG. 6 is a block diagram showing a configuration of UE of the second embodiment. The UE of the second embodiment differs from the UE of the first embodiment in operation of an event determining part. Except this operation of the event determining part, the second embodiment is similar to the first embodiment and in FIG. 6, explanation is simplified or omitted by assigning the same numerals or corresponding numerals to the portions equal or equivalent to the components shown in FIG. 3.

An event determining part 261 included by the UE of the second embodiment instructs a reception quality measuring part 159 to again measure reception quality with previously notified timing based on a measured result of the reception quality measuring part 159. That is, the event determining part 261 instructs the reception quality measuring part 159 to again measure reception quality with timing of a blank subframe when reception quality of a pico-cell is a predetermined level or less. Also, the event determining part 261 determines whether or not the UE satisfies a condition (event condition) for executing an event such as handover based on a measured result at the time when the reception quality measuring part 159 measures the reception quality with timing of the blank subframe.

Figure 7:
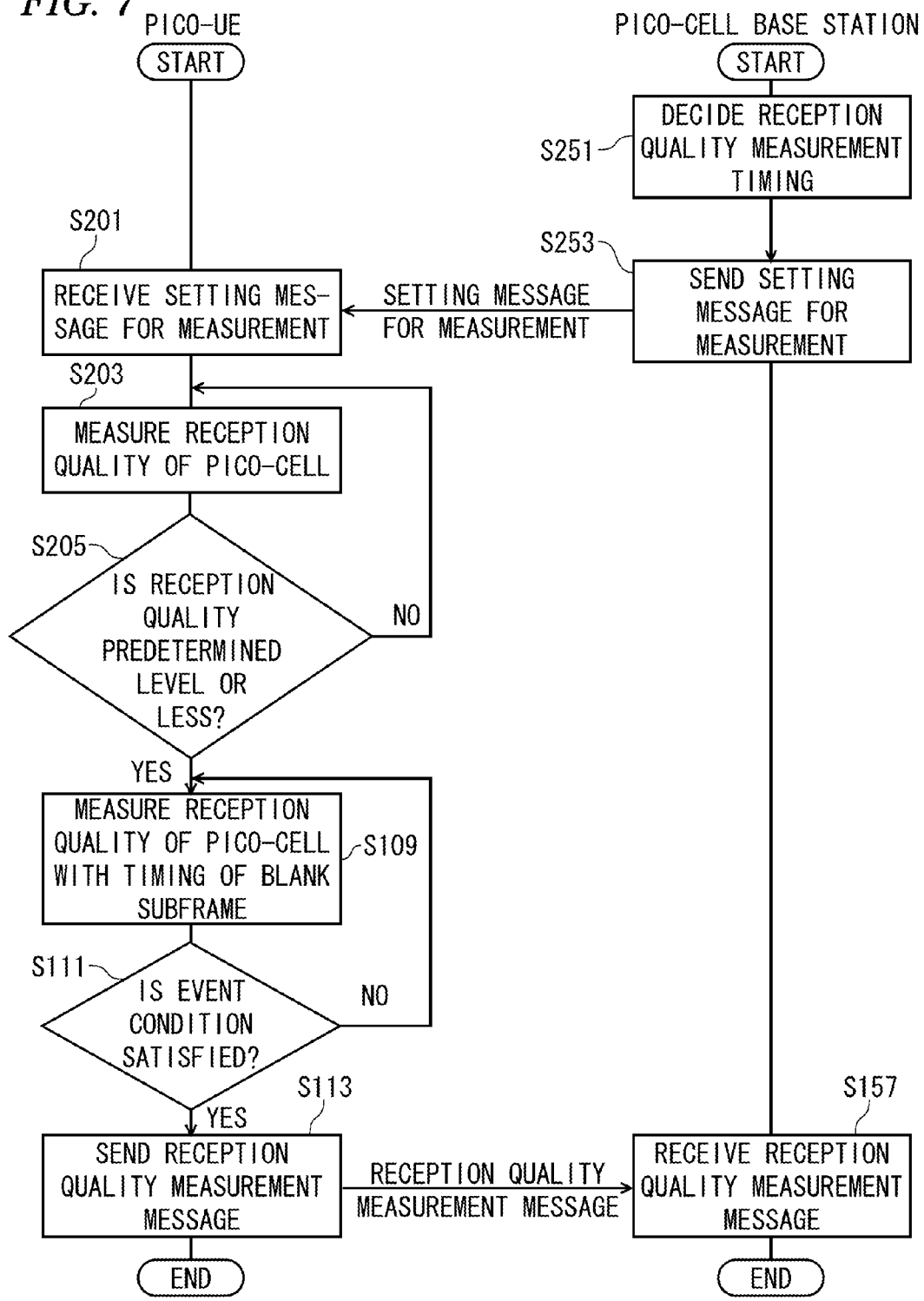
FIG. 7 is a flowchart showing each operation of a pico-UE and a pico-cell base station in a state in which the UE of the second embodiment is connected to the pico-cell base station, and is signaling between the pico-UE and the pico-cell base station.

FIG. 7 is a flowchart showing each operation of the pico-UE and the pico-cell base station in a state in which the UE of the second embodiment is connected to the pico-cell base station, and is signaling between the pica-UE and the pico-cell base station. In addition, in FIG. 7, the same reference numerals are assigned to steps common to FIG. 5.

As shown in FIG. 7, the pico-cell base station decides reception quality measurement timing of the pico-UE based on timing of a blank subframe indicated by blank subframe information obtained from a macrocell base station (step S251). Next, the pico-cell base station sends a setting message for measurement including a parameter for measurement according to the reception quality measurement timing decided in step S251 to the pico-UE (step S253).

The pico-UE receives the setting message for measurement sent from the pico-cell base station in step S253 (step S201). The pico-UE measures reception quality of the pico-cell (step S203). Then, the pico-UE decides whether or not reception quality measured in step S201 is a predetermined level or less (step S205). When the reception quality is the predetermined level or less in step S205, the flowchart proceeds to step S109, and when the reception quality exceeds the predetermined level, the flowchart returns to step S203. Steps subsequent to step S109 are similar to those of the first embodiment.

According to the second embodiment as described above, the pico-UE measures reception quality with timing of a blank subframe of a downlink signal of the macrocell base station. Consequently, connection between the pica-cell and the pico-UE which is likely to hand over to a macrocell is maintained like the first embodiment. Also, in the first embodiment, the pico-UE sends the reception quality measurement message to the pico-cell base station before reception quality of the pico-cell is measured with timing of the blank subframe. However, in the second embodiment, it is unnecessary for the pico-UE to send the reception quality measurement message, so that the amount of signaling between the pico-UE and the pico-cell base station can be reduced.

Third Embodiment

Figure 8:
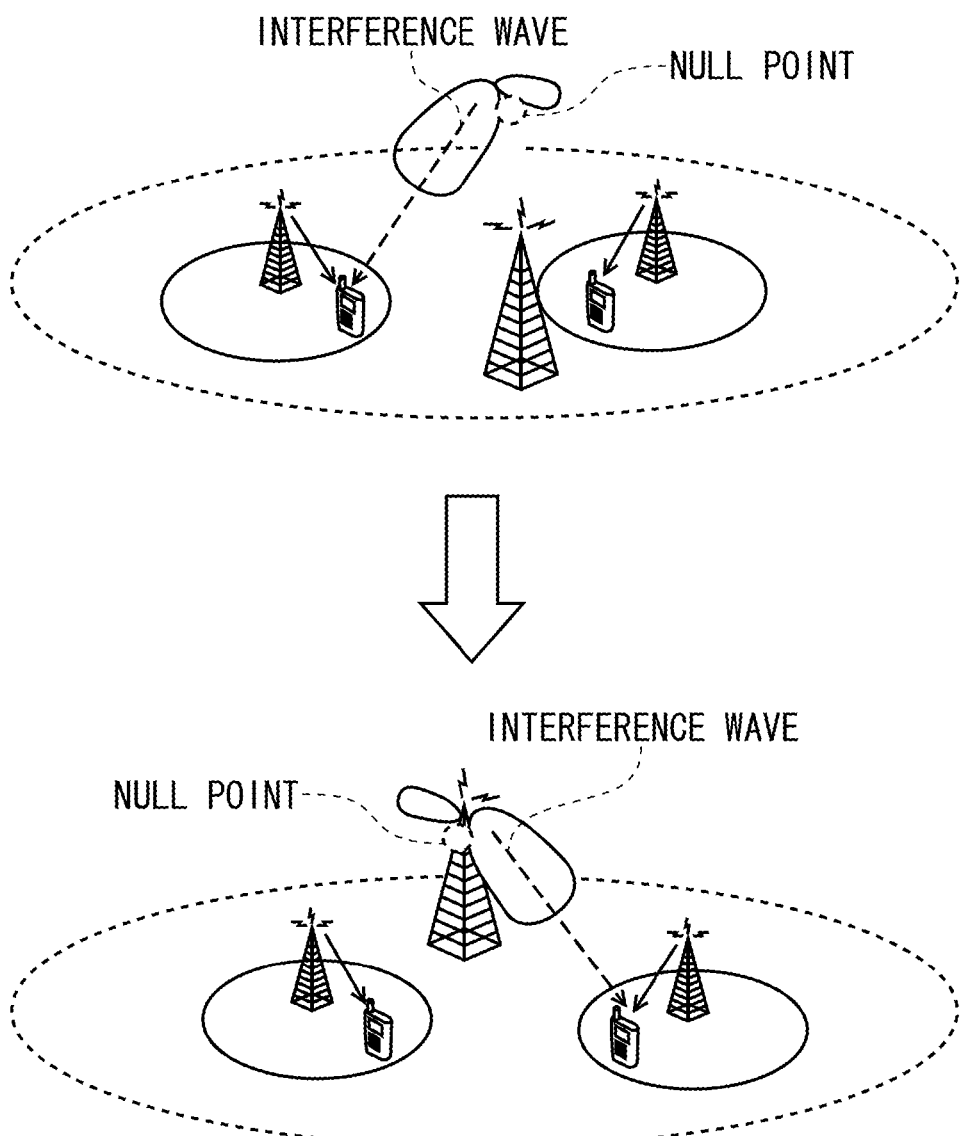
FIG. 8 is a diagram showing interference control using beam forming in the HetNet environment.

In a third embodiment, a macrocell base station performs interference control using "Beam Forming" in a wireless communication system of a HetNet environment. The beam forming refers to the art of changing a direction of a beam sent to UE under the control of a macrocell according to a situation of a propagation path as shown in FIG. 8. The macrocell base station performs the beam forming for changing directivity with time and thereby, interference between cells which pico-UE located in a direction of a null point suffers from the macrocell can be reduced. In addition, the interference between cells which the pico-UE suffers from the macrocell is minimized at the time when a null point of a beam emitted by the macrocell base station is turned to the pico-UE. Information about timing of the null point of the beam emitted by the macrocell base station is shared between the macrocell base station and a pico-cell base station formed inside the macrocell.

Figure 9:
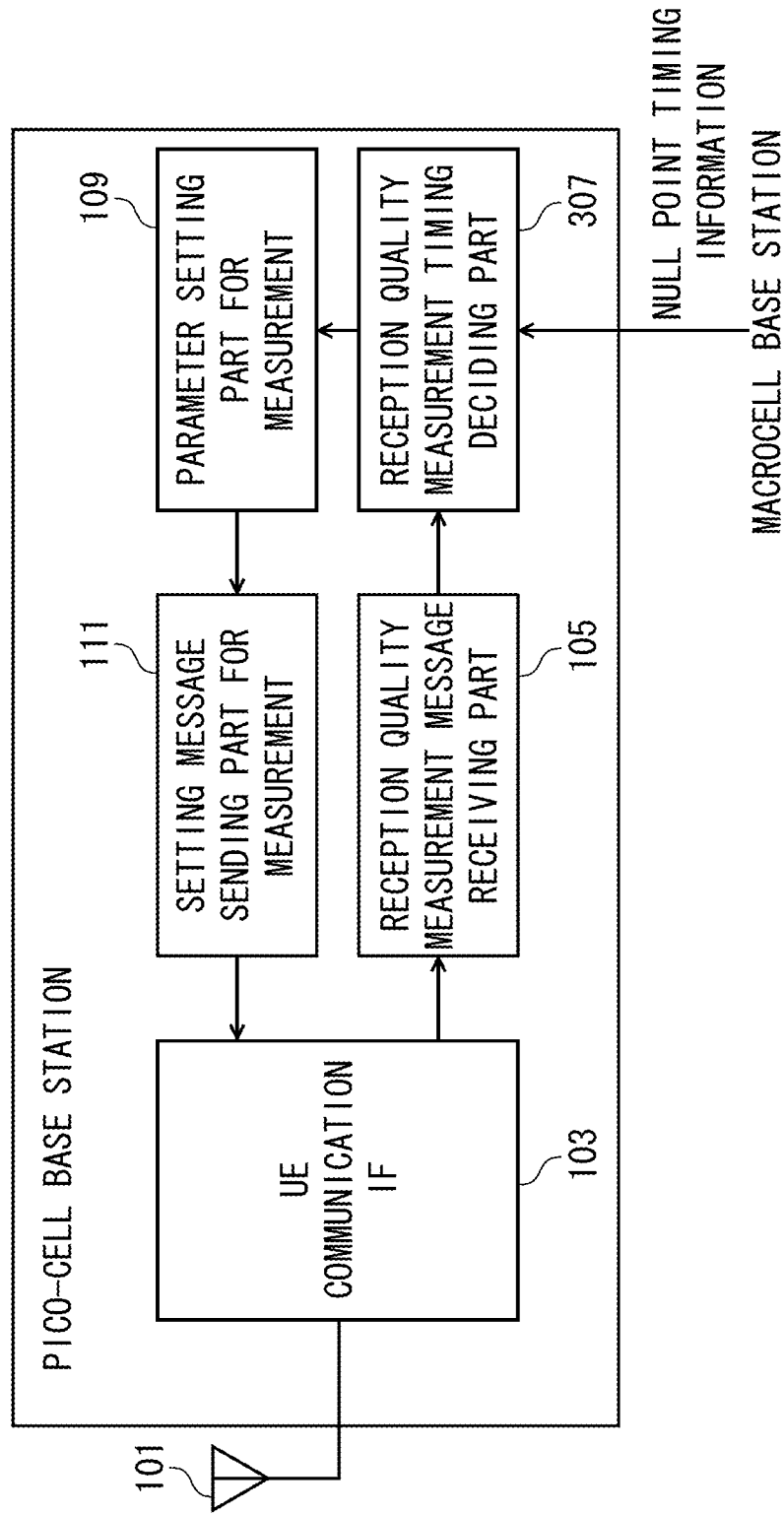
FIG. 9 is a block diagram showing a configuration of a pica-cell base station of a third embodiment.

FIG. 9 is a block diagram showing a configuration of the pico-cell base station of the third embodiment. The pica-cell base station of the third embodiment differs from the pico-cell base station of the first or second embodiment in operation of a reception quality measurement timing deciding part. Except this operation of the reception quality measurement timing deciding part, the third embodiment is similar to the first or second embodiment and in FIG. 9, explanation is simplified or omitted by assigning the same numerals or corresponding numerals to the portions equal or equivalent to the components shown in FIG. 3.

A reception quality measurement timing deciding part 307 included by the pico-cell base station of the third embodiment decides timing with which the pico-UE measures reception quality based on information (null point timing information) about timing of a null point sent from the macrocell base station. In addition, the reception quality measurement timing deciding part 307 decides timing of the null point indicated by the null point timing information as timing with which the pico-UE located in a direction of the null point measures reception quality.

A configuration of UE of the third embodiment is similar to the configuration of the UE of the first embodiment shown in FIG. 4 or the configuration of the UE of the second embodiment shown in FIG. 6. When the UE of the third embodiment is similar to that of the first embodiment, a flowchart showing each operation of the pico-UE and the pico-cell base station in a state in which the UE of the third embodiment is connected to the pico-cell base station, and signaling between the pico-UE and the pico-cell base station are similar to those of FIG. 5. However, the blank subframe is replaced with the null point. Also, when the UE of the third embodiment is similar to that of the second embodiment, a flowchart showing each operation of the pica-UE and the pico-cell base station in a state in which the UE of the third embodiment is connected to the pico-cell base station, and signaling between the pico-UE and the pico-cell base station are similar to those of FIG. 7. However, also in this case, the blank subframe is replaced with the null point.

According to the third embodiment as described above, the pico-UE measures reception quality with timing with which a null point of a beam emitted by the macrocell base station is turned to the pico-UE. Consequently, connection between the pico-cell and the pico-UE which is likely to hand over to the macrocell is maintained like the first and second embodiments. Thus, a state in which a load of the macrocell base station is distributed can be continued without increasing interference between the macrocell and the pico-cell.

Fourth Embodiment

In a fourth embodiment, when UE (hereinafter called "macro-UE") connected to a macrocell is located in the vicinity of a pico-cell, the macro-UE measures reception quality of the pico-cell with timing of a blank subframe of a downlink signal of a macrocell base station. In addition, the macrocell base station of the fourth embodiment previously notifies the macro-UE of information about timing (timing of the blank subframe) in the case where the macro-UE measures reception quality of the pico-cell by notification information or a setting message for measurement.

Figure 10:
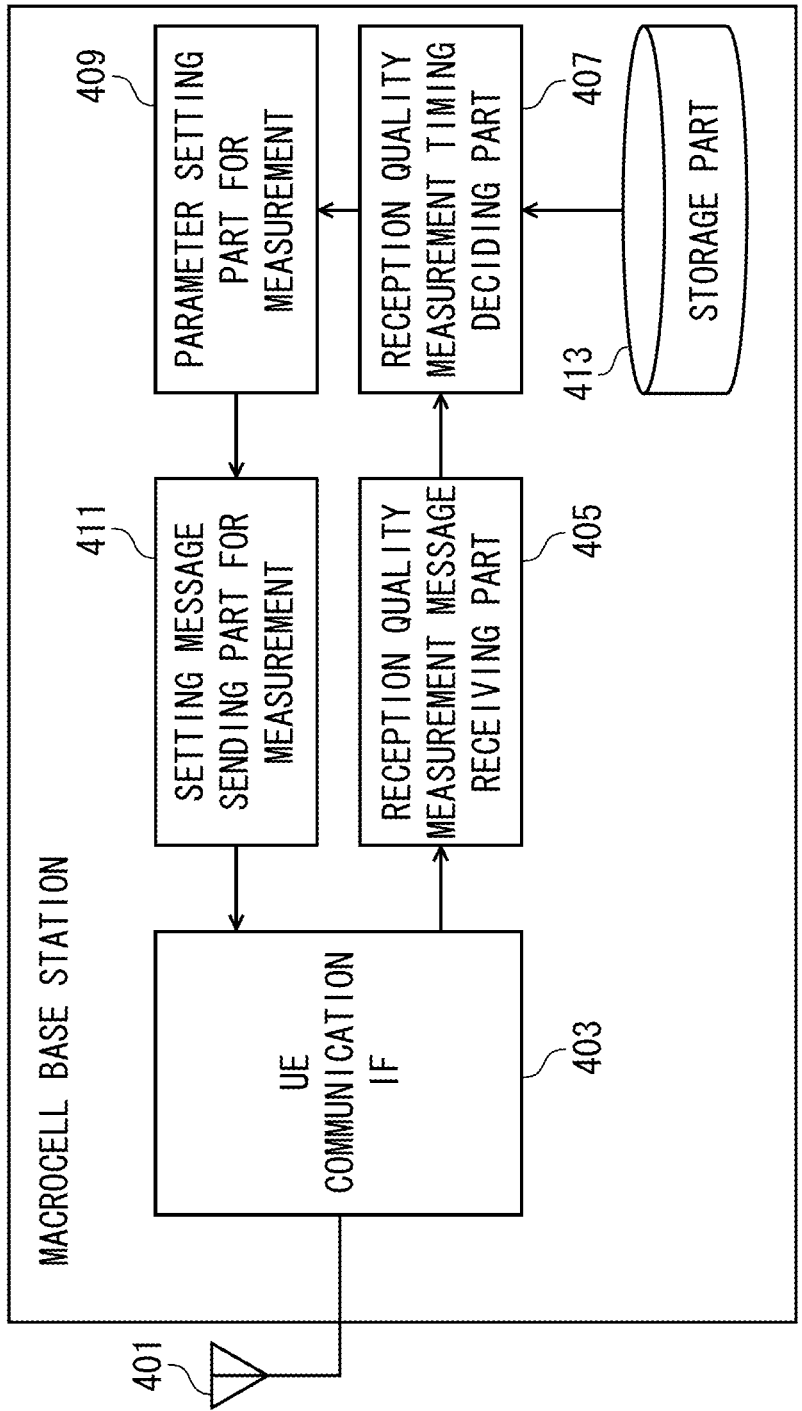
FIG. 10 is a block diagram showing a configuration of a macrocell base station of a fourth embodiment.

FIG. 10 is a block diagram showing a configuration of the macrocell base station of the fourth embodiment. As shown in FIG. 10, the pico-cell base station of the first embodiment includes an antenna 401, a UE communication interface part (UE communication IF) 403, a reception quality measurement message receiving part 405, a storage part 413, a reception quality measurement timing deciding part 407, a parameter setting part 409 for measurement, and a setting message sending part 411 for measurement.

The UE communication IF 403 is an interface for communicating with the macro-UE. The reception quality measurement message receiving part 405 receives a reception quality measurement message (Measurement Report) sent from the macro-UE. The storage part 413 stores information (blank subframe information) about timing of a blank subframe. The reception quality measurement timing deciding part 407 decides timing with which the macro-UE measures reception quality of the pico-cell based on the blank subframe information stored in the storage part 413. In addition, the reception quality measurement timing deciding part 407 decides timing of the blank subframe indicated by the blank subframe information as reception quality measurement timing.

The parameter setting part 409 for measurement sets a parameter for measurement according to the reception quality measurement timing decided by the reception quality measurement timing deciding part 407 in a setting message for measurement described below. In addition, the parameter setting part 409 for measurement may set identification information in the parameter for measurement. The setting message sending part 411 for measurement sends a setting message for measurement (Measurement Configuration) including the parameter for measurement of reception quality to the macro-UE.

Figure 11:
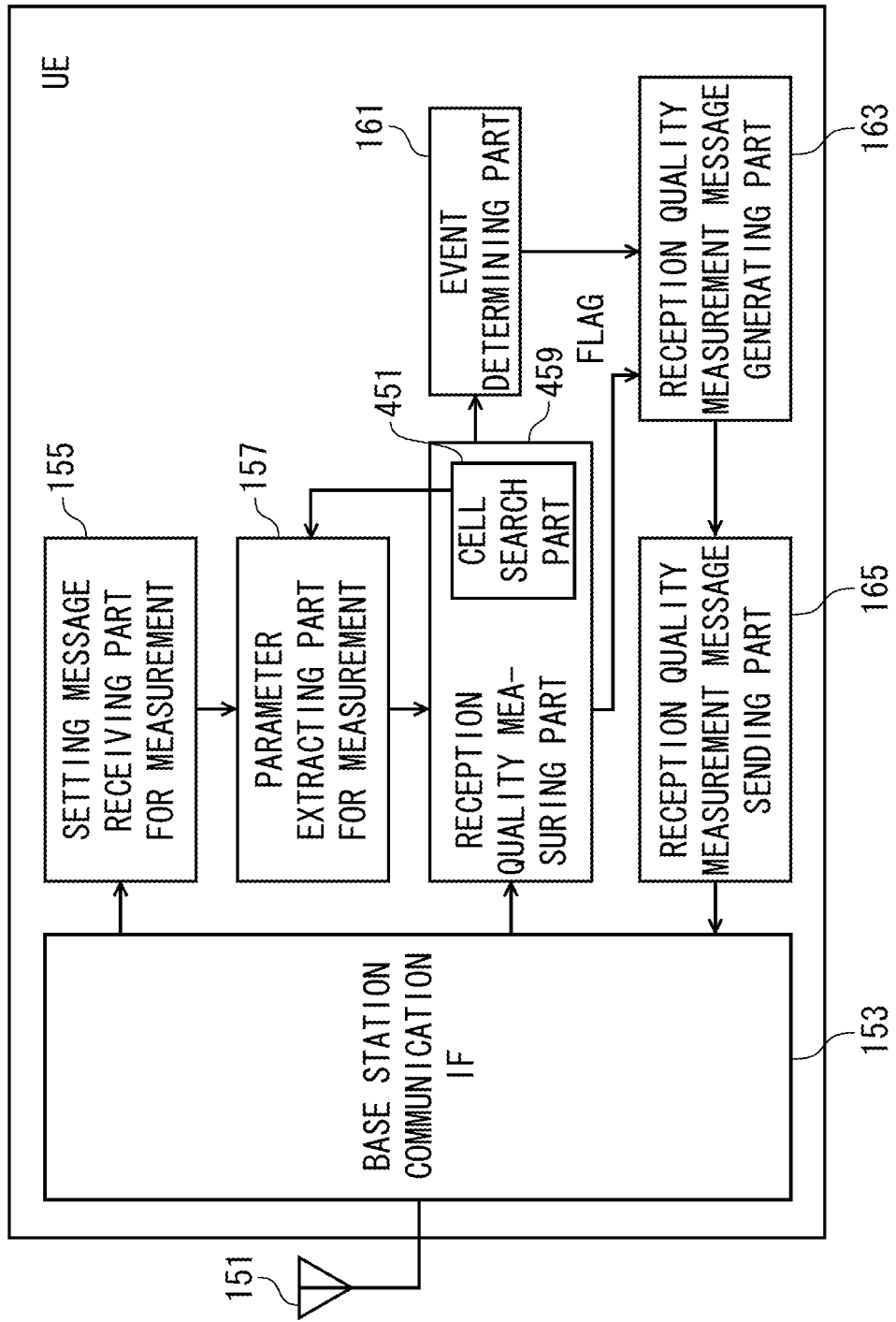
FIG. 11 is a block diagram showing a configuration of UE of the fourth embodiment.

FIG. 11 is a block diagram showing a configuration of UE of the fourth embodiment. The UE of the fourth embodiment differs from the UE of the first embodiment in a reception quality measuring part. Except this reception quality measuring part, the fourth embodiment is similar to the first embodiment and in FIG. 11, explanation is simplified or omitted by assigning the same numerals or corresponding numerals to the portions equal or equivalent to the components shown in FIG. 4.

A reception quality measuring part 459 included by the fourth embodiment measures reception quality of a downlink signal from a pico-cell base station or the macrocell base station. Also, when a parameter extracting part 157 for measurement extracts the parameter for measurement, the reception quality measuring part 459 measures the reception quality of the downlink signal from the pico-cell base station with timing indicated by the parameter for measurement. In the case of measuring the reception quality of the downlink signal from the connected pico-cell base station with timing (timing of a blank subframe) indicated by the parameter for measurement, the reception quality measuring part 459 sends a flag indicating that the reception quality is measured with the timing to a reception quality measurement message generating part 163.

Also, the reception quality measuring part 459 of the present embodiment has a cell search part 451. The cell search part 451 searches a cell present in the periphery based on the reception quality of the pico-cell or the macrocell measured by the reception quality measuring part 459. Also, the cell search part 451 inquires cell information obtained by a cell search of peripheral pico-cell information (for example, cell ID area information or cell ID of the pico-cell) previously notified from the macrocell base station, and decides that the pico-cell is present in the periphery when the cell information matches with the pico-cell information. Further, the cell search part 451 instructs the reception quality measuring part 459 to measure reception quality with timing of a blank subframe in the case that the pico-cell is detected in this manner.

Figure 12:
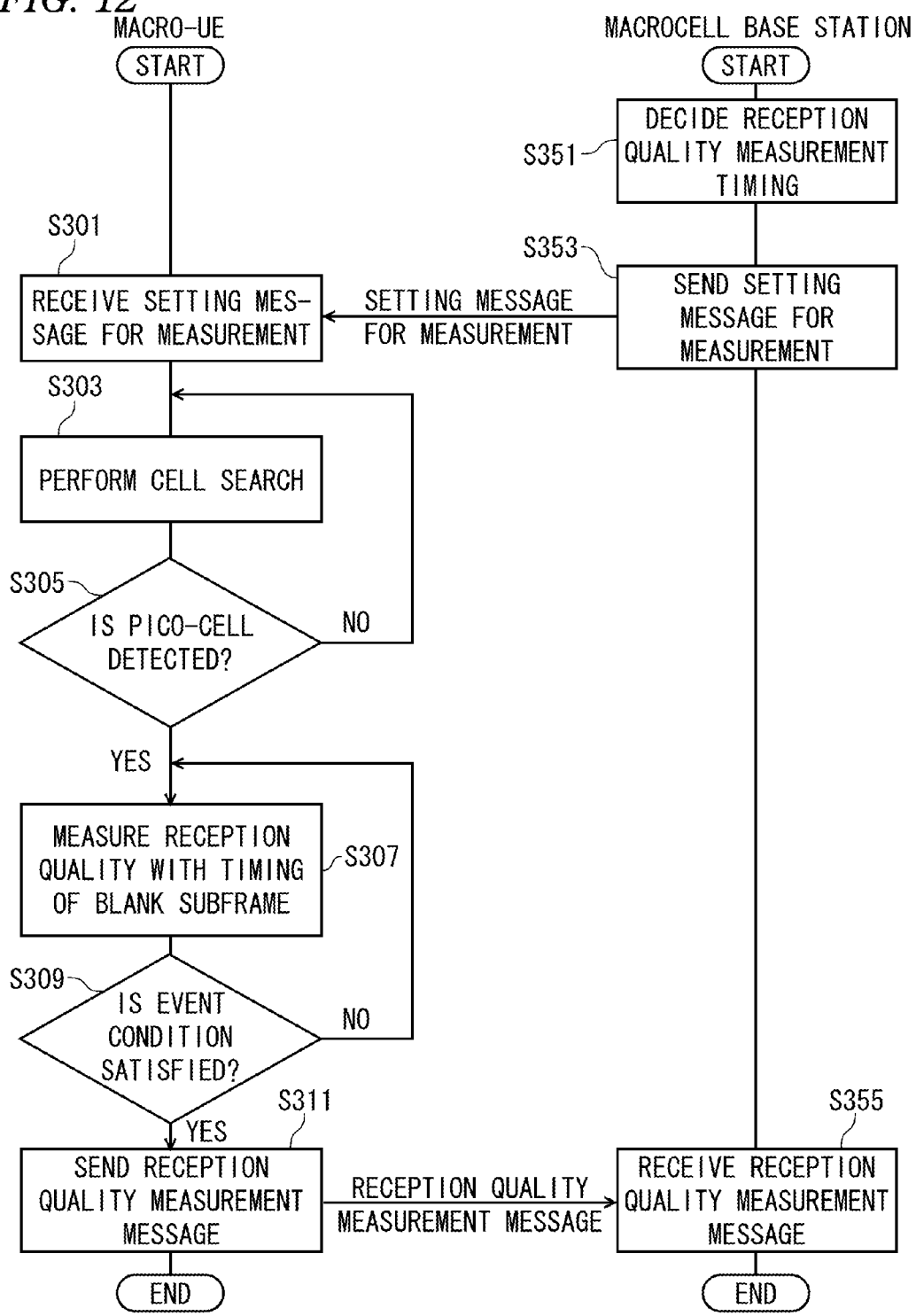
FIG. 12 is a flowchart showing each operation of a macro-UE and the macrocell base station in a state in which the UE of the fourth embodiment is connected to the macrocell base station, and is signaling between the macro-UE and the macrocell base station.

FIG. 12 is a flowchart showing each operation of the macro-UE and the macrocell base station in a state in which the UE of the fourth embodiment is connected to the macrocell base station, and is signaling between the macro-UE and the macrocell base station. As shown in FIG. 12, the macrocell base station decides reception quality measurement timing of the macro-UE based on timing of a blank subframe indicated by blank subframe information (step S351). Next, the macrocell base station sends a setting message for measurement including a parameter for measurement according to the reception quality measurement timing decided in step S351 to the macro-UE (step S353).

The macro-UE receives the setting message for measurement sent from the macrocell base station in step S353 (step S301). The macro-UE performs a cell search (step S303). Then, the macro-UE decides whether or not a pico-cell is detected as a result of the cell search performed in step S303 (step S305). In the case of deciding that the pico-cell is detected in step S305, the flowchart proceeds to step S307, and in the case of deciding that the pico-cell is not detected, the flowchart returns to step S303.

In step S307, the macro-UE measures reception quality of the pico-cell with timing indicated by the parameter for measurement included in the setting message for measurement received in step S301, that is, timing of the blank subframe. Then, the macro-UE determines whether or not an event condition is satisfied (step S309). In addition, an event determining part 161 of the macro-UE determines that the event condition is satisfied when a measured value of the reception quality of the pico-cell exceeds a threshold value in step S309.

In the case of determining that the event condition is satisfied in step S309, the flowchart proceeds to step S311, and in the case of determining that the event condition is not satisfied, the flowchart returns to step S307. In step S311, the macro-UE sends a reception quality measurement message including identification information about the parameter for measurement or a flag indicating that the reception quality is measured with the timing of the blank subframe to the macrocell base station. The macrocell base station receives the reception quality measurement message sent from the macro-UE in step S311 (step S355). After step S355, the macrocell base station and the macro-UE execute an event such as handover to the pico-cell.

According to the fourth embodiment as described above, when the macro-UE is located in the vicinity of the pico-cell, the macro-UE measures reception quality of the pico-cell with timing of a blank subframe. With the timing of the blank subframe, the macrocell base station does not send a signal other than a control signal or sends a signal with transmission power reduced. Consequently, reception quality of the pico-cell measured by the macro-UE with the timing of the blank subframe is better than reception quality in the case of being measured with other timing. As a result, the macro-UE in the vicinity of the pico-cell is actively connected to the pico-cell. Thus, a load of the macrocell base station can be distributed without using the art called "Range Expansion" described in the background art.

In addition, when the macrocell base station performs interference control using the beam forming as shown in the third embodiment, the macro-UE may measure reception quality of the pico-cell with timing with which a null point of a beam emitted by the macrocell base station is turned to the macro-UE.

Fifth Embodiment

In the fourth embodiment, the macro-UE is actively connected to the pica-cell even when reception quality of the pico-cell is bad in order to distribute a load of the macrocell base station. However, when reception quality of the pica-cell is bad, a wireless resource with good reception quality is not necessarily allocated to the UE. In this case, there is a possibility that the UE cannot obtain a high throughput. In a fifth embodiment, with respect to UE handed over to a pico-cell with bad reception quality by distributing a load, timing of reception quality measurement (CQI measurement) for deciding a modulation method or data allocation is limited to a blank subframe of a macrocell. Also, a subframe of a pico-cell in which data is allocated to the UE is limited to a subframe of the same timing as the blank subframe of the macrocell.

Figure 13:
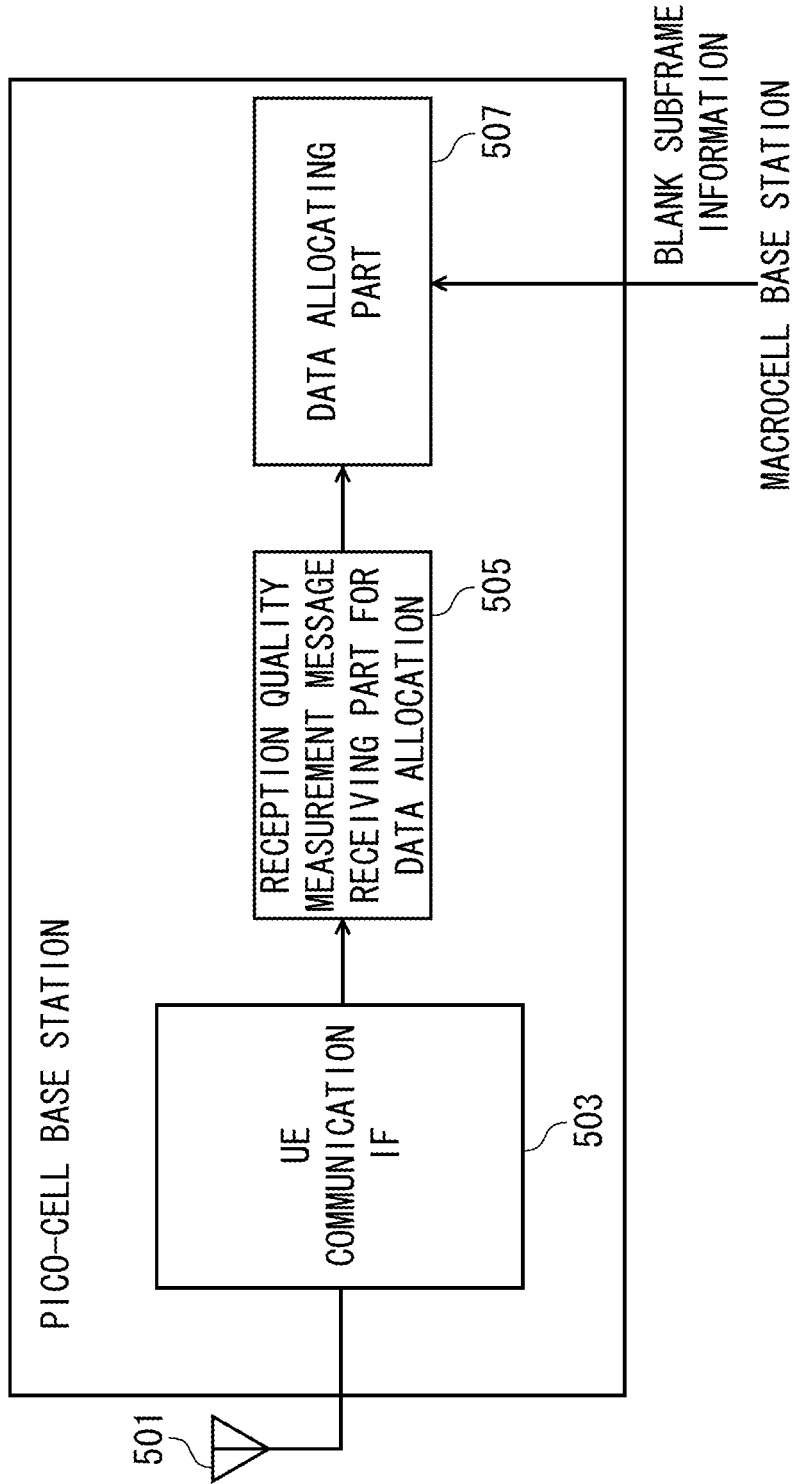
FIG. 13 is a block diagram showing a configuration of a pico-cell base station of a fifth embodiment.

FIG. 13 is a block diagram showing a configuration of a pico-cell base station of the fifth embodiment. As shown in FIG. 13, the pico-cell base station of the fifth embodiment includes an antenna 501, a UE communication interface part (UE communication IF) 503, a reception quality measurement message receiving part 505 for data allocation, and a data allocating part 507.

The UE communication IF 503 is an interface for communicating with pico-UE. The reception quality measurement message receiving part 505 for data allocation receives a reception quality measurement message. The data allocating part 507 allocates a resource for communication with the pico-UE. In addition, when a flag indicating a result (CQI) measured by limiting a subframe is included in the reception quality measurement message received by the reception quality measurement message receiving part 505 for data allocation, the data allocating part 507 allocates a resource limited to a subframe with low interference from a macrocell base station.

Figure 14:
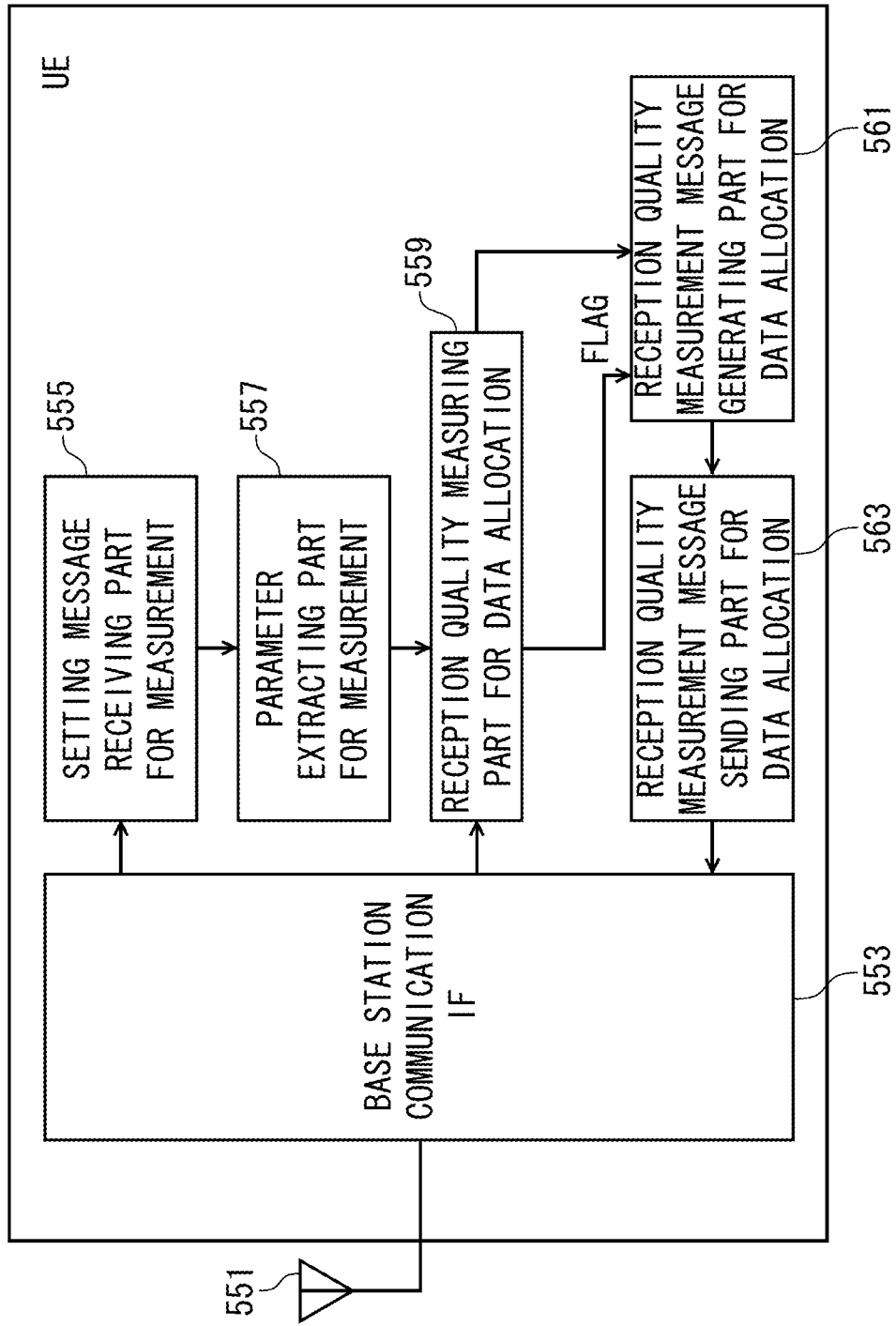
FIG. 14 is a block diagram showing a configuration of UE of the fifth embodiment.

FIG. 14 is a block diagram showing a configuration of UE of the fifth embodiment. As shown in FIG. 14, the UE of the fifth embodiment includes an antenna 551, a base station communication interface part (base station communication IF) 553, a setting message receiving part 555 for measurement, a parameter extracting part 557 for measurement, a reception quality measuring part 559 for data allocation, a reception quality measurement message generating part 561 for data allocation, and a reception quality measurement message sending part 563 for data allocation.

The base station communication IF 553 is an interface for communicating with the pica-cell base station. The setting message receiving part 555 for measurement receives a setting message for measurement sent from the pico-cell base station. The parameter extracting part 557 for measurement extracts a parameter for measurement from the setting message for measurement received by the setting message receiving part 555 for measurement.

The reception quality measuring part 559 for data avocation measures reception quality for data allocation in a state limited to timing of a subframe with low interference using reception quality measurement timing included in the setting message for measurement. At this time, the reception quality measuring part 559 for data allocation sends a flag indicating a result (CQI) measured by limiting the subframe to the reception quality measurement message generating part 561 for data allocation. In addition, the flag is not used in the case of being instructed from the pico-cell base station to be notified of both of a measured result of reception quality limited to timing of the subframe with low interference and a measured result of reception quality without being limited to the timing when the UE measures reception quality for data allocation.

The reception quality measurement message generating part 561 for data allocation generates a reception quality measurement message (CQI Report). In addition, when the flag indicating the result (CQI) measured by limiting the subframe is sent from the reception quality measuring part 559 for data allocation, the reception quality measurement message generating part 561 for data allocation includes the flag in the reception quality measurement message. The reception quality measurement message sending part 563 for data allocation sends the reception quality measurement message generated by the reception quality measurement message generating part 561 for data allocation to the pico-cell base station.

Figure 15:
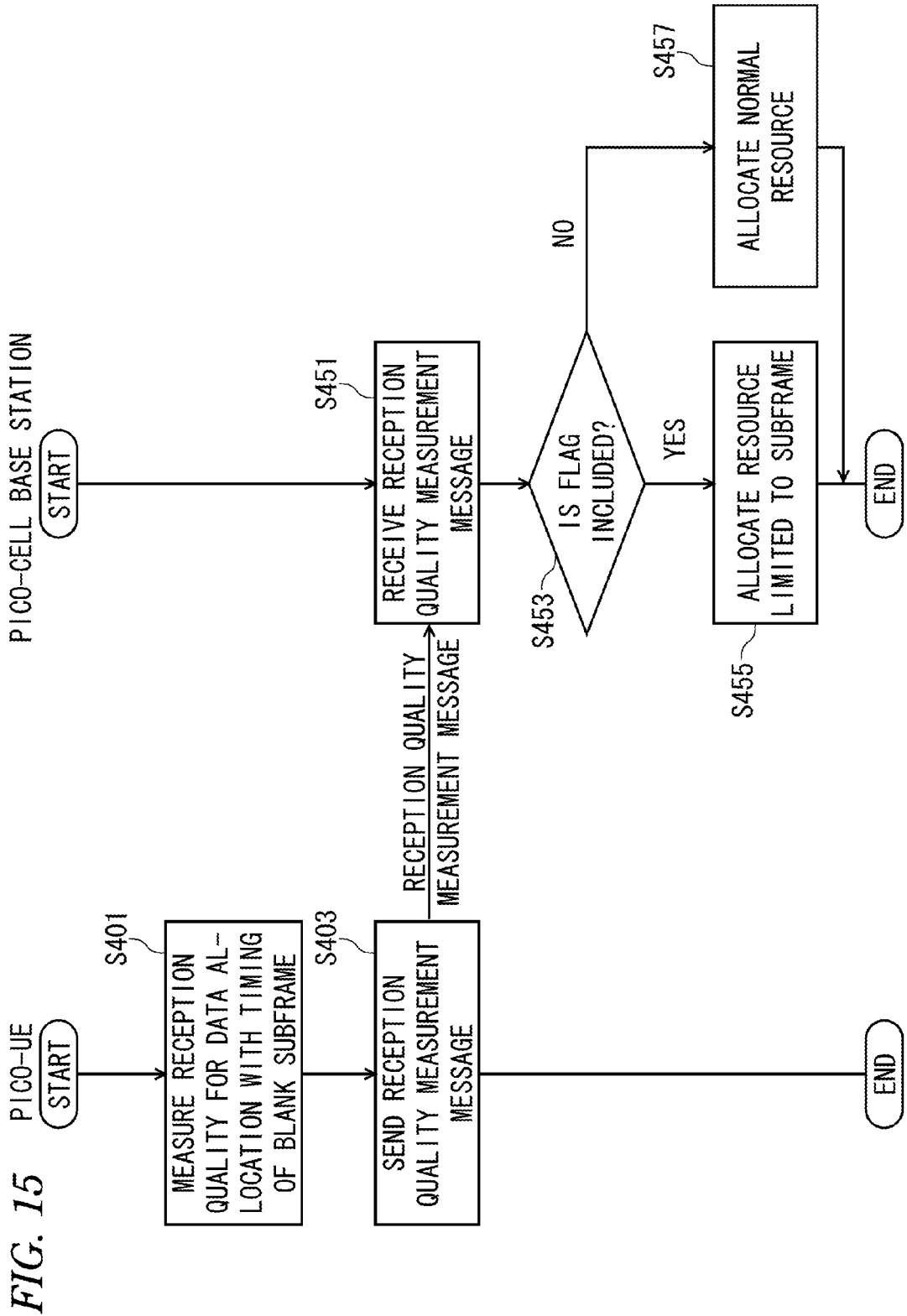
FIG. 15 is a flowchart showing each operation of a pica-UE and the pico-cell base station after the UE of the fifth embodiment connected to a macrocell base station is connected to the pico-cell base station, and is signaling between the pico-UE and the pico-cell base station.
Figure 16:
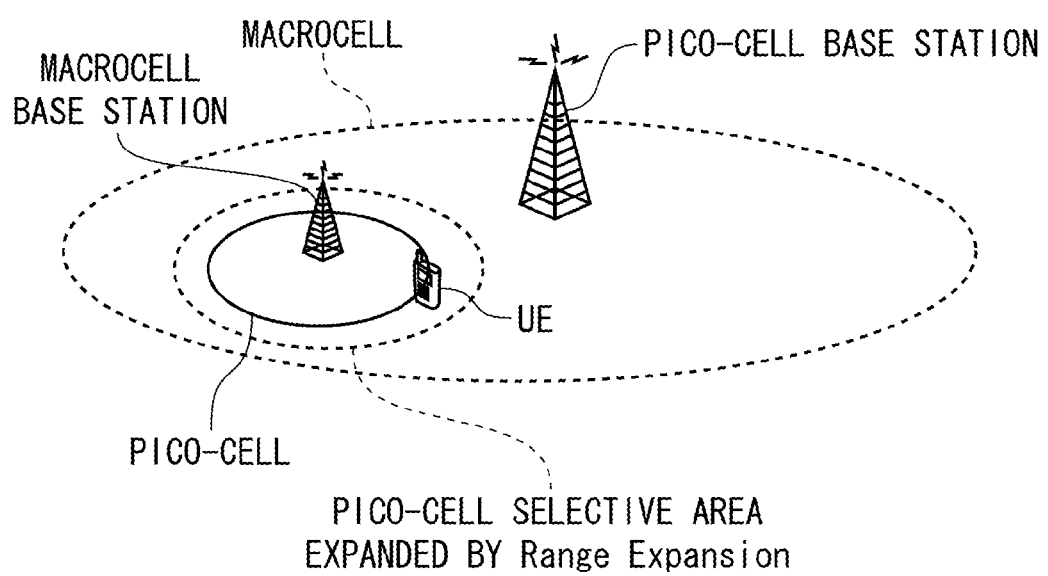
FIG. 16 is a diagram conceptually showing the technical contents of "Range Expansion".
Figure 17:
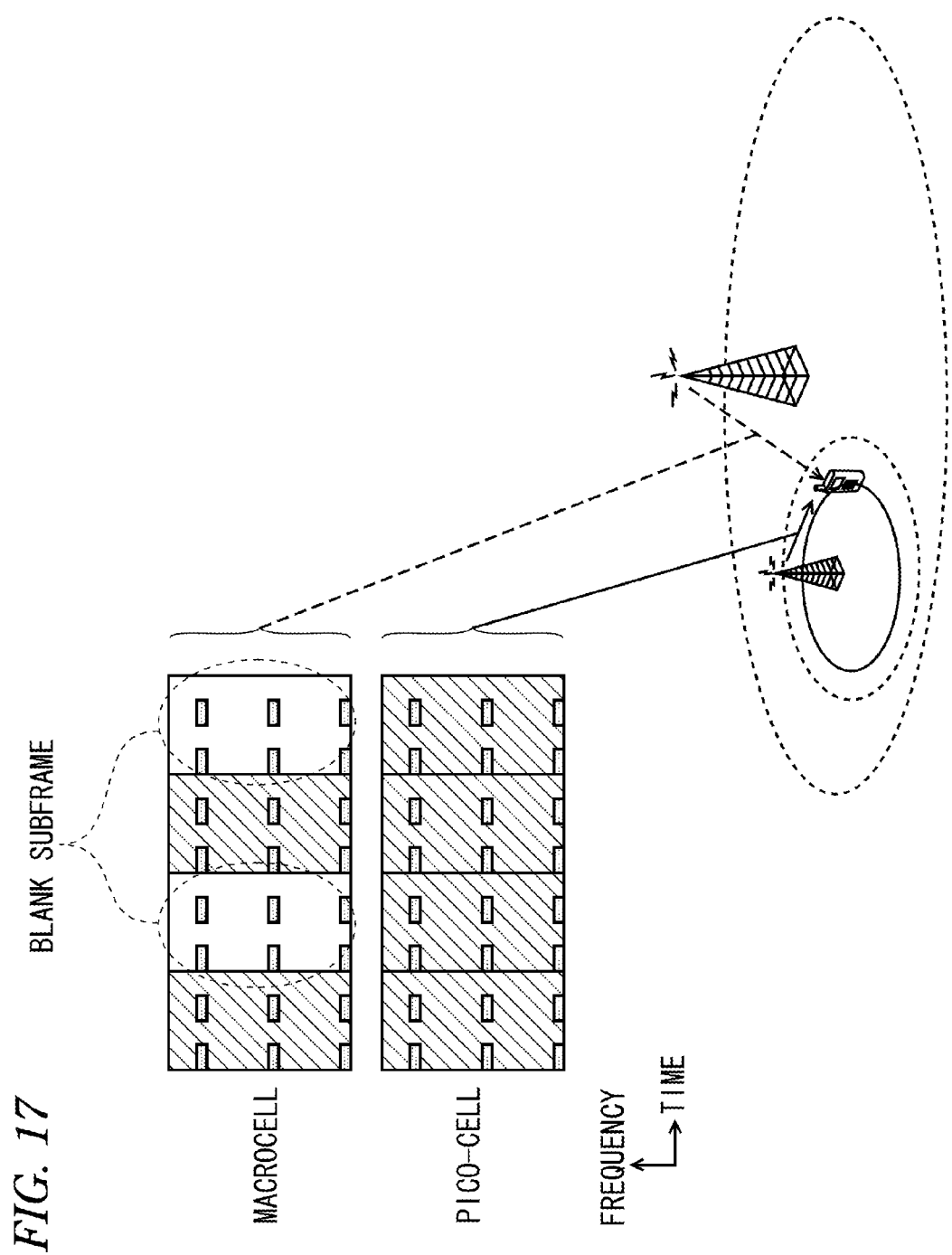
FIG. 17 is a diagram conceptually showing the technical contents of "Almost Blank Subframe".

FIG. 15 is a flowchart showing each operation of the pico-UE and the pico-cell base station after the UE of the fifth embodiment connected to the macrocell base station is connected to the pico-cell base station, and is signaling between the pico-UE and the pico-cell base station. As shown in FIG. 15, the pico-UE makes reception quality measurement (CQI measurement) for data allocation with timing of a subframe (blank subframe) with low interference (step S401). Next, the pico-UE sends a reception quality measurement message (CQI Report) to the pico-cell base station (step S403).

The pico-cell base station receives the reception quality measurement message sent from the pico-UE in step S403 (step S451). Then, the pico-cell base station decides whether or not a flag indicating a result (CQI) measured by limiting the subframe is included in the reception quality measurement message (step S453). In the case of deciding that the flag is included in step S453, the flowchart proceeds to step S455 and in the case of deciding that the flag is not included, the flowchart proceeds to step S457. In step S455, the pico-cell base station allocates a resource limited to the subframe with low interference from the macrocell base station for communication with the pica-cell. In step S457, the pico-cell base station allocates a normal resource for communication with the pico-cell.

According to the fifth embodiment as described above, for communication with the pico-cell, a resource limited to the subframe with low interference from the macrocell base station is allocated to the UE connected to the pico-cell even when reception quality of the pico-cell is bad in order to distribute a bad of the macrocell base station. That is, a resource with better reception quality is allocated to the UE. Also, the reception quality measurement (CQI measurement) for data allocation is made in a state limited to timing of a blank subframe of the macrocell. Consequently, a decrease in throughput of communication between the pico-UE and the pico-cell possible to occur in order to distribute the bad of the macrocell base station can be reduced.

In each of the embodiments described above, the macrocell base station and the pico-cell base station as the base station constructing the HetNet environment are described as an example, but the contents of the embodiments described above can also be applied to the HetNet environment constructed of the macrocell base station and a femtocell base station.

Also, in each of the embodiments described above, the case of constructing the invention by hardware is described as an example, but the invention can also be implemented by software.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

In addition, in the embodiments described above, the antenna is described, but an antenna port can be applied similarly. The antenna port refers to a logical antenna constructed of one or plural physical antennas. That is, the antenna port does not necessarily refer to one physical antenna, and may refer to an array antenna etc. constructed of plural antennas. For example, in LTE (Long Term Evolution), the antenna port is not defined as the number of physical antennas constructed, and is defined as the minimum unit capable of sending a reference signal with a different base station. Also, the antenna port may be defined as the minimum unit in which weighting of a precoding vector is multiplied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-197829) filed on Sep. 3, 2010, the disclosure of which is incorporated herein by reference in its entirety.

INDUSTRIAL APPLICABILITY

A wireless communication system according to the invention is useful as, for example, the wireless communication system for distributing a load of a macrocell base station without increasing interference between a macrocell and a low transmission power cell.

REFERENCE SIGNS LIST

101, 151, 401, 501, 551 ANTENNA
103, 403, 503 UE COMMUNICATION INTERFACE PART (UE COMMUNICATION IF)
105, 405 RECEPTION QUALITY MEASUREMENT MESSAGE RECEIVING PART
107, 307, 407 RECEPTION QUALITY MEASUREMENT TIMING DECIDING PART
109, 409 PARAMETER SETTING PART FOR MEASUREMENT
111, 411 SETTING MESSAGE SENDING PART FOR MEASUREMENT
153, 553 BASE STATION COMMUNICATION INTERFACE PART (BASE STATION COMMUNICATION IF)
155, 555 SETTING MESSAGE RECEIVING PART FOR MEASUREMENT
157, 557 PARAMETER EXTRACTING PART FOR MEASUREMENT
159, 459 RECEPTION QUALITY MEASURING PART
161, 261 EVENT DETERMINING PART
163 RECEPTION QUALITY MEASUREMENT MESSAGE GENERATING PART
165 RECEPTION QUALITY MEASUREMENT MESSAGE SENDING PART
413 STORAGE PART
451 CELL SEARCH PART
505 RECEPTION QUALITY MEASUREMENT MESSAGE RECEIVING PART FOR DATA ALLOCATION
507 DATA ALLOCATING PART
559 RECEPTION QUALITY MEASURING PART FOR DATA ALLOCATION
561 RECEPTION QUALITY MEASUREMENT MESSAGE GENERATING PART FOR DATA ALLOCATION
563 RECEPTION QUALITY MEASUREMENT MESSAGE SENDING PART FOR DATA ALLOCATION

The invention claimed is:

1. A wireless communication system comprising:
   a macrocell base station,
   a low transmission power cell base station which is located inside a macrocell supplied by the macrocell base station and configured to supply a low transmission power cell with transmission power lower than that of the macrocell base station and configured to communicate with the macrocell base station, and
   a wireless terminal capable of communicating with the macrocell base station or the low transmission power cell base station by wireless, wherein
   the macrocell base station is configured to perform control of reducing interference between the macrocell and the low transmission power cell by submitting a downlink signal in a specific subframe of the macrocell base station, wherein information about a timing of the specific subframe is shared between the macrocell base station and the low transmission power cell base station, and
   the low transmission power cell base station has:
   a reception quality measurement timing deciding part configured to decide reception quality measurement timing with which the wireless terminal measures reception quality of the low transmission power cell based on information about the timing of the specific subframe obtained from the macrocell base station, and
   a setting message sending part for measurement configured to send to the wireless terminal a setting message for measurement including a parameter for measurement according to the timing of the specific subframe, and
   the wireless terminal has:
   a setting message receiving part for measurement configured to receive a setting message for measurement including the parameter for measurement according to the timing of the specific subframe sent from the macrocell base station connected to the wireless terminal, a reception quality measuring part configured to measure reception quality of a downlink signal submitted by the low transmission power cell matching with identification information about a cell supplied by the low transmission power cell base station and indicated by the parameter for measurement according to the timing of the specific subframe included in the setting message for measurement, an event determining part configured to determine whether or not the wireless terminal satisfies a condition for executing a handover to the macrocell base station based on a measured result of the reception quality measuring part performed according to the timing of the specific subframe assigned by the macrocell base station, wherein the condition for executing the handover is satisfied when the measured reception quality of the low transmission power cell decreases below a threshold value, and a reception quality measurement message sending part configured to send a reception quality measurement message including information indicating that measurement of the reception quality measuring part is made according to the timing of the specific subframe assigned by the macrocell base station when the event determining part determines that the condition is satisfied.

2. A wireless communication system comprising:

a macrocell base station, a low transmission power cell base station which is located inside a macrocell supplied by the macrocell base station and configured to supply a low transmission power cell with transmission power lower than that of the macrocell base station and configured to communicate with the macrocell base station, and a wireless terminal capable of communicating with the macrocell base station or the low transmission power cell base station by wireless, wherein the macrocell base station is configured to perform control of reducing interference between the macrocell and the low transmission power cell by submitting a downlink signal in a specific subframe of the macrocell base station, wherein information about a timing of the specific subframe is shared between the macrocell base station and the low transmission power cell base station, and the macrocell base station has:

a reception quality measurement timing deciding part configured to decide reception quality measurement timing with which the wireless terminal measures reception quality of the low transmission power cell based on information about the timing of the specific subframe obtained from the macrocell base station, and a setting message sending part for measurement configured to send to the wireless terminal a setting message for measurement including a parameter for measurement according to the timing of the specific subframe, and the wireless terminal has:

a setting message receiving part for measurement configured to receive a setting message for measurement including the parameter for measurement according to the timing of the specific subframe sent from the macrocell base station connected to the wireless terminal, a reception quality measuring part configured to measure reception quality of a downlink signal submitted by the macrocell base station matching with identification information about a cell supplied by the low transmission power cell base station located in the periphery of the wireless terminal and indicated by the parameter for measurement according to the timing of the specific subframe included in the setting message for measurement, an event determining part for determining whether or not the wireless terminal satisfies a condition for executing a handover to the macrocell base station based on a measured result of the reception quality measuring part performed according to the timing of the specific subframe assigned by the macrocell base station, wherein the condition for executing the handover is satisfied when the measured reception quality of the low transmission power cell decreases below a threshold value, and a reception quality measurement message sending part configured to send a reception quality measurement message including information indicating that measurement of the reception quality measuring part is made according to the timing of the specific subframe assigned by the macrocell base station when the event determining part determines that the condition is satisfied.

3. The wireless communication system as claimed in claim 1, wherein with the specific timing with which the macrocell base station performs control of reducing interference between cells, the macrocell base station is configured not to send a signal other than a control signal or configured to send a signal with transmission power reduced.

4. The wireless communication system as claimed in claim 1, wherein the macrocell base station is configured to perform beam forming for changing directivity with time, and with the specific timing with which the macrocell base station performs control of reducing interference between cells, a null point of a beam emitted by the macrocell base station is turned to the wireless terminal.

5. The wireless communication system as claimed in claim 1, wherein after the wireless terminal connected to the macrocell base station previously is connected to the low transmission power cell base station, the wireless terminal is configured to make reception quality measurement for data allocation with the timing of the specific subframe of the macrocell base station and configured to send a reception quality measurement message to the low transmission power cell including specific information indicating that the measurement is made in the timing of the specific subframe of the macrocell base station, and the low transmission power cell base station is configured to allocate a resource limited to the specific subframe of the macrocell base station for communication with the wireless terminal when the specific information is included in the reception quality measurement message sent from the wireless terminal.

6. A low transmission power cell base station in a wireless communication system comprising:

a macrocell base station, the low transmission power cell base station which is located inside a macrocell supplied by the macrocell base station and configured to supply a low transmission power cell with transmission power lower than that of the macrocell base station and can communicate with the macrocell base station, and a wireless terminal capable of communicating with the macrocell base station or the low transmission power cell base station by wireless, wherein the low transmission power cell base station comprises:

a reception quality measurement timing deciding part configured to decide reception quality measurement timing with which the wireless terminal measures reception quality of the low transmission power cell based on information about timing of a specific subframe obtained from the macrocell base station and when the measured reception quality of the low transmission power cell decreases below a threshold value, and a setting message sending part for measurement configured to send to the wireless terminal a setting message for measurement including a parameter for measurement according to the timing of the specific subframe, and the parameter for measurement includes identification information about a cell targeted for reception quality measurement according to the timing of the specific subframe and offset information applied to reception quality of the low transmission power cell base station by the wireless terminal.

7. The wireless communication system as claimed in claim 1, wherein when the reception quality of the low transmission power cell measured by the wireless terminal decreases and the condition for executing the handover is satisfied once, the handover is not executed immediately, and the reception quality of the low transmission power cell is measured again based on information about the timing of the specific subframe obtained from the macrocell base station.

8. The wireless communication system as claimed in claim 1, wherein the specific subframe is used only for transmitting the downlink signal or a signal with a reduced transmission power.

* * * * *